Patented July 18, 1950

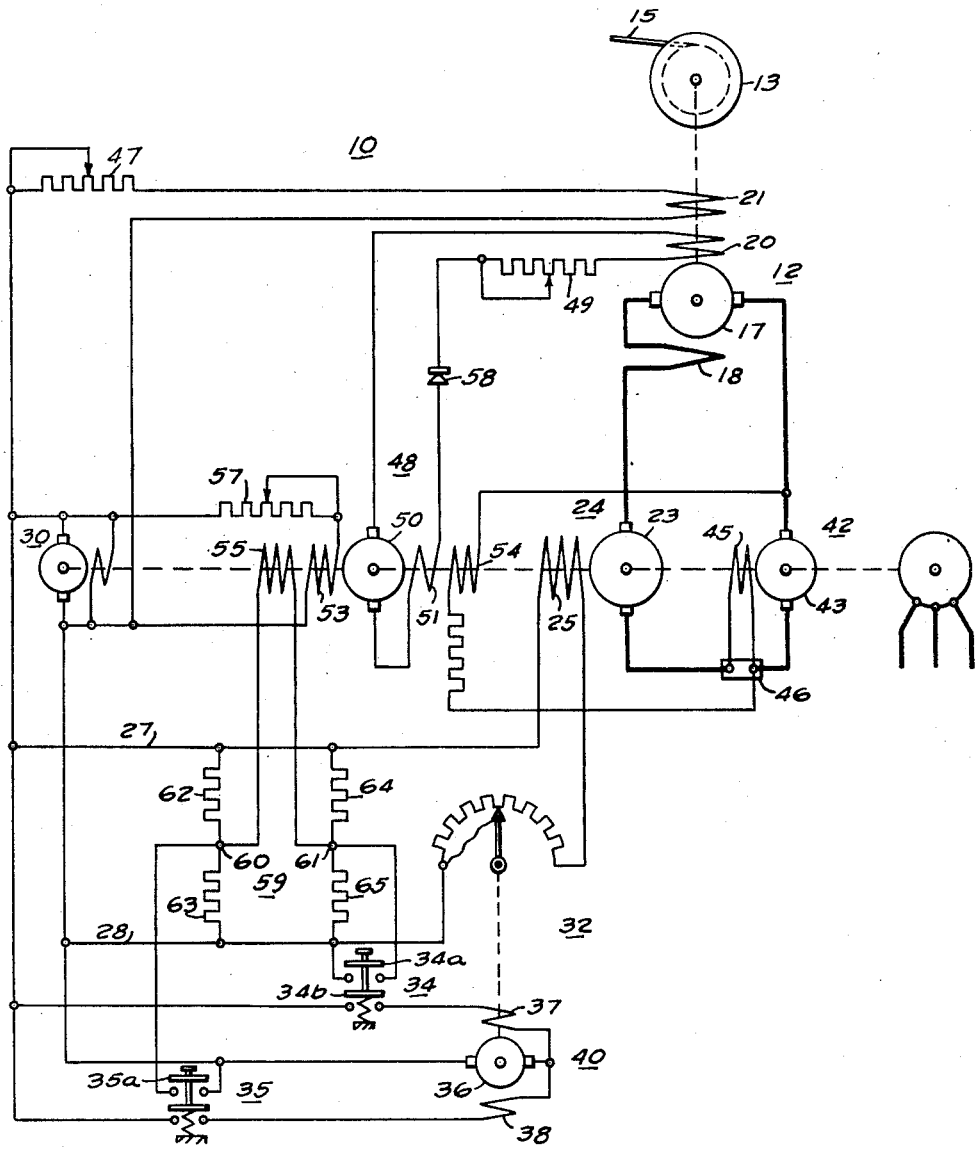

2,516,001

UNITED STATES PATENT OFFICE 2,516,001

TORQUE CONTROL SYSTEM FOR ELECTRIC REEL MOTORS

William R. Harding, East Aurora, N. Y., and Basil J. Auburn, Pittsburgh, Pa., assignors to Westinghouse Electric Corporation, East Pittsburgh, Pa., a corporation of Pennsylvania Application November 7, 1946, Serial No. 708,379

6 Claims. (Cl. 318—6)

Our invention relates, generally, to electrical control systems and it has reference, in particular, to control systems for strip reel motors, and the like.

Generally stated, it is an object of our invention to provide a control system for strip reel motors which is simple and inexpensive to manufacture, and which is easy to install and operate.

More specifically, it is an object of our invention to provide for controlling a reel motor to compensate for the inertia of the reel, coil and other rotating parts during changes in speed.

It is an important object of our invention to provide for varying the operating level of a regulating generator of the self-energizing type in a reel motor control system during acceleration and deceleration of the reel motor so as to compensate for the inertia of rotating elements in the reel system.

Yet another object of our invention is to provide for so controlling the energization of an inertia compensating field winding on a regulating generator as to increase or decrease the effective energization of the pattern field winding during acceleration or deceleration.

A further object of our invetnion is to provide for connecting an inertia compensating field winding of a regulating generator in a bridge circuit which is controlled in accordance with the speed of a motor being regulated, so as to increase or decrease the torque of the motor.

Other objects will, in part, be obvious and will, in part, be explained hereinafter.

In practicing our invention in one form thereof, a booster generator responsive to the armature current of a reel motor is connected in the armature circuit thereof to compensate for the IR drop. The reel motor is provided with a stabilizing field winding energized from a control source so as to provide a minimum safe operating field excitation. The main regulating field winding of the reel motor is energized from a regulating generator having a pattern field winding energized from a control source, a differential regulating field winding energized from the booster generator and a compensating field winding. The compensating field winding is connected in the indicating leg of a bridge circuit whose impedance is selectively unbalanced by switch means operable when the motor accelerates or decelerates, so as to effectively increase or decrease the energization of the pattern field winding.

For a more complete understanding of the nature and scope of our invention, reference may be made to the following detailed description which may be studied in connection with the accompanying drawing in which the single figure is a diagrammatic view of a reel system embodying the invention in one of its forms.

Referring to the drawing, the reference numeral 10 may denote, generally, a control system for a reel motor 12 which is operatively connected in driving relation with a reel 13 for winding or unwinding a strip of material 15.

The reel motor 12 may be of any suitable type having an armature 17 with a compensating field winding 18 connected in circuit therewith, and being provided with main and auxiliary field windings 20 and 21. Energization of the armature 17 may be effected by connecting the armature 17 across the armature 23 of a variable voltage source such as a main generator 24 having a field winding 25. The field winding 25 may be energized from any suitable source being, for example, connected by means of conductors 27 and 28 to a generator 30. Means, such as a motor-driven rheostat 32, may be connected in circuit relation with the field winding 25 of the generator for varying the energization thereof. Operation of the rheostat may be controlled by means of "raise" and "lower" push button switches 34 and 35 operable to energize the armature 36 in circuit with "raise" and "lower" field windings 37 and 38 of the rheostat motor 40, respectively.

In order to regulate the operation of the reel motor 12, means, such as the booster generator 42, may be provided. The armature 43 of the booster generator 42 may be connected in series circuit relation with the armature 17 of the reel motor for varying the voltage applied thereto. The field winding 45 of the booster generator may be energized in accordance with the armature current of the reel motor 12 by connecting it across the shunt 46 in the armature circuit. The booster generator may thus be utilized to compensate for the IR drop in the reel motor armature circuit.

The auxiliary field winding 21 may be connected through a rheostat 47 to the generator 30 to provide a minimum safe field.

In order to provide for maintaining a predetermined tension in the strip 15, means, such as the regulating generator 48, may be connected to the main field winding 20 in circuit with a rheostat 49 for controlling the energization of the main field winding of the reel motor. The regulating generator 48 may be provided with an armature 50 and a self-energizing field winding 51 of the series type which may be connected in circuit with the field winding 20 of the reel motor. The generator 48 may also be provided with a pattern field winding 53, a differential or regulating field winding 54 and an inertia compensating field winding 55. The pattern field winding 53 may be so connected to a suitable source, such as the generator 30, through a control rheostat 57 which may be adjusted to determine the energization of the field winding 20 as to tend to cause the field winding 20 to oppose the auxiliary field winding 21 whereby it is possible to produce any desired predetermined tension in the strip 15. A rectifier device 58 may be connected in circuit relation with the field winding 20 to prevent actual energization in this sense. The differential field winding 54 may be energized in accordance with the current in the armature circuit of the reel motor being, for example, connected across the armature 43 of the booster generator 42 so as to oppose the pattern field winding 53 and balance it when the desired tension is produced.

Energization of the inertia compensating field winding 55 may be effected by connecting the field winding 55 in the balancing or indicating leg of a Wheatstone bridge circuit 59, wherein the impedance is varied in response to speed change conditions of the reel motor. The field winding 55 may, for example, be connected between the mid-points 60 and 61 of pairs of resistors 62, 63 and 64, 65 connected between the conductors 27 and 28. The impedance of this bridge circuit may be selectively varied by operating the "raise" and "lower" push button switches 34 and 35 to selectively shunt all or portions of the resistor 63 and 65 to produce opositely unbalanced conditions when the voltage of the main generator 24 is raised or lowered to accelerate or decelerate the reel motor 12, respectively.

In the operation of the system, the speed of the strip 15 remains substantially constant as determined by the speed of the preceding roll stand (not shown). When the reel 13 is empty at the start of the winding operation, the speed of the reel motor 12 must necessarily be at a maximum. Under these conditions, the output of the regulating generator 48 will be at substantially a minimum, reverse energization of the field winding 20 due to the predominating effect of the pattern field winding 53 being blocked by the rectifier device 58. As the diameter of the coil 13 increases, the torque demand of the reel motor increases, so that its armature current also increases. An increase in the armature current results in an increased output voltage of the booster generator 42 to compensate for the increase in IR drop. This also increases the energization of the differential field winding 54 of the regulating generator 48. Acordingly, the output voltage of the regulating generator 48 increases, strengthening the energization of the field winding 20 of the reel motor. Accordingly, the reel motor slows down, reducing the armature current to the predetermined normal value. The self-energizing field winding 51 of the regulating generator maintains the output voltage of the generator at the value which produces this balanced condition. As the diameter of the coil continues to increase, the output voltage of the regulating generator continues to increase, so as to maintain the predetermined tension in the strip 15. Any reduction in the strip tension results in reduced energization of the differential field winding 54, which reduces the output of the regulating generator and weakens the energization of the motor field winding 20, to effect a speeding up of the reel motor to restore the desired strip tension.

Whenever the reel motor 12 is to be accelerated, the "raise" push button switch 34 will be operated to close contact member 34b and connect the "raise" field winding 37 and armature 36 to the generator 30. At the same time, contact member 34a closes to shunt resistor 65. An unbalanced condition is thereby produced in the bridge circuit 59 so that current flows through the inertia compensating field winding 55 of the regulating generator in a direction from the junction point 60 to the junction point 61, thereby making the field winding 55 cumulative with respect to the pattern field winding 53 and increasing the effective pattern field energization. Accordingly, the energization of the differential field winding 54 must increase in order to restore a balanced operating condition, and the output voltage of the regulating generator is accordingly reduced, whereby the reel motor 12 is permitted to develop increased torque during acceleration. This increased torque compensates for the inertia of the reel 13 and other rotating elements so that the tension of the strip 15 is maintained substantially constant.

When the "lower" push button switch 35 is operated to effect deceleration of the reel motor 12, the resistor 63 is shunted by contact member 35a and an unbalanced current flows through the inertia compensating field winding 55 in the opposite direction. This results in a reduction in the operating torque of the reel motor 12 so as to compensate for inertia and retain the strip tension susbtantially constant during deceleration.

In an unwinding system the field of the reel motor 12 should be a maximum at the start, so that the main and auxiliary field windings 20 and 21 are cumulative. The rectifier device 58 may therefore be omitted since the pattern field predominates at the start and the regulating generator output is at a maximum. As the coil diameter decreases the reel motor speed increases and the reel motor armature current tends to increase. This reduces the regulating generator output and weakens the energization of the reel motor field winding 20 thereby reducing the armature current to the proper value. The coil diameter continues to decrease and the energization of the field winding 20 continues to increase. Inertia compensation may be effected by reversing the connections of the compensating field winding 55, so that the net pattern field of the reel motor 12 is increased on deceleration and decreased on acceleration, which is the opposite for the case of a winding reel.

From the above description and the accompanying drawing, it will be apparent that we have provided a simple and effective reel control system wherein the tension of the strip is maintained at a substantially constant value during changes in speed as well as during normal operating conditions at a constant speed. By varying the energization of the inertia compensating field winding, the net pattern field may be readily changed without changing the predetermined energization of the pattern field winding itself. A control system embodying the features of our invention is simple and inexpensive to manufacture, and which utilizes a minimum number of moving parts so that maintenance expenses are held to a minimum. Current regulation in a system embodying the features of our invention is greatly facilitated since the inertia compensation is effected by field control.

Since certain changes may be made in the above-described construction and different embodiments of the invention may be made without departing from the scope and spirit thereof, it is intended that all the matter contained in the above description and shown in the accompanying drawing shall be considered as illustrative and not in a limiting sense.

We claim as our invention:

1. For use with a reel motor having an armature and a field winding, circuit means connecting the armature to a variable voltage source, and control means connected to effect energization of the field winding including a regulating generator having a pattern field winding arranged to provide a predetermined motor torque, a differential field winding energized in accordance with the armature current of the reel motor and a compensating field winding disposed to be selectively connected for cumulative or differential energization with respect to the pattern field winding during acceleration or deceleration of the motor.

2. In a reel drive system; a reel motor having an armature and a plurality of field windings; control means operable to effect variable energization of the armature to accelerate and decelerate the motor; circuit means energizing one of said fields to provide a minimum safe field for the motor; additional circuit means connected to effect energization of another field winding including a regulating generator having an output sustaining series field winding, a pattern field winding energized to produce a predetermined motor torque, a differential regulating field winding energized in accordance with the reel motor armature current, and an inertia compensating field winding, and circuit means including contact means associated with the control means reversibly connecting the compensating winding to be energized cumulatively or differentially with respect to the pattern field winding depending on whether the motor is accelerating or decelerating.

3. The combination with a reel motor having an armature and a field winding; of a booster generator connected in circuit relation with the armature and having a field winding energized in accordance with the reel motor armature current; and a regulating generator connected to energize the field winding, said generator having a pattern field winding energized to produce a predetermined motor field, a differential control field winding energized from the booster generator, and an inertia compensating winding connected in a bridge circuit for reversible energization when the motor is accelerating or decelerating.

4. In a reel drive system; a reel motor having an armature and a field winding; circuit means connecting the armature to a source of variable voltage power; control means operable to increase or decrease the voltage of the source; a regulating generator connected to energize said field winding and having a pattern field winding energized from a source of substantially constant control voltage, a differential control field winding energized in accordance with the load on the reel motor, and an inertia compensating winding; and circuit means reversibly connecting the compensating field winding to a source of electrical energy in accordance with operations of said control means.

5. In a drive reel system; a reel motor having an armature connected to a source of electrical energy and having a field winding; a booster generator having an armature connected in circuit with the reel motor armature and having a field winding energized in accordance with the reel motor armature current; a regulating generator having an armature connected to energize the reel motor field winding and having a series field winding arranged to maintain the output voltage of the armature at a balancing value, a pattern field winding energized from a source of substantially constant voltage, a differential control winding connected across the booster generator armature, and a compensating field winding connected in the bridging circuit of a Wheatstone bridge circuit having impedance means in adjacent legs variable in accordance with acceleration or deceleration of the reel motor.

6. In a control system for a reel drive motor having an armature arranged to be connected to a source of electrical energy and having a plurality of field windings; circuit means connecting one of the field windings to a source of electrical energy to provide a minimum safe field; a regulating generator having a self-energizing series winding and an armature connected in circuit relation with another of the field windings, a pattern field winding arranged to be energized from a source of control voltage to provide a predetermined motor torque, a differential regulating field winding and an inertia compensating winding; means including a booster generator responsive to the armature current of the reel motor connected in circuit with the reel motor armature and for energizing the differential field winding; means including a network of impedance means connecting the compensating field winding to a source of electrical energy; and means responsive to acceleration and deceleration of the motor operable to effect reversible energization of the compensating field winding when the motor accelerates and decelerates.

WILLIAM R. HARDING.
BASIL J. AUBURN.

REFERENCES CITED

The following references are of record in the file of this patent:

UNITED STATES PATENTS

| Number | Name | Date |
|---|---|---|
| 1,621,429 | Petersen | Mar. 15, 1927 |
| 2,406,426 | King | Aug. 27, 1946 |
| 2,447,654 | Kenyon | Aug. 24, 1948 |